United States Patent [19]

Hergenrother et al.

[11] Patent Number: 5,310,817
[45] Date of Patent: May 10, 1994

[54] PROCESS AND CATALYST FOR PRODUCING PARTIALLY HYDROGENATED DIENE POLYMERS CONTAINING ENDO AND EXO CHAIN TRISUBSTITUTED UNSATURATION

[75] Inventors: William L. Hergenrother; John M. Doshak, both of Akron, Ohio

[73] Assignee: Bridgestone/Firestone, Inc., Akron, Ohio

[21] Appl. No.: 111,358

[22] Filed: Aug. 24, 1993

[51] Int. Cl.$^5$ ............................................... C08F 8/02
[52] U.S. Cl. .............................. 525/332.8; 525/332.9; 525/333.1; 525/333.2; 525/338; 525/339; 525/340
[58] Field of Search ............... 525/332.8, 332.9, 333.1, 525/333.2

[56] References Cited

U.S. PATENT DOCUMENTS

| | | | |
|---|---|---|---|
| 3,312,752 | 4/1967 | Schleimer | 525/332.8 |
| 3,525,729 | 8/1970 | Gaeth . | |
| 3,642,658 | 2/1972 | Allum et al. . | |
| 3,789,090 | 1/1974 | Otsuki et al. | 525/333.2 |
| 3,983,183 | 9/1976 | Kampf | 525/333.2 |
| 4,012,566 | 3/1977 | Zelinski et al. | 525/332.8 |
| 4,207,409 | 6/1980 | Ladenberger et al. . | |
| 4,496,613 | 1/1985 | Zagefka et al. | 525/333.2 |
| 4,990,573 | 2/1991 | Audreussi et al. | 525/333.2 |

Primary Examiner—Bernard Lipman
Attorney, Agent, or Firm—Frank J. Troy, Sr.

[57] ABSTRACT

A process for producing partially hydrogenated diene polymers containing unsaturation in the endo and exo configurations while substantially eliminating the unsaturation in the 1,4-trans configuration, by isomerizing the unsaturation during hydrogenation in the presence of an arylphosphine isomerizing agent.

6 Claims, No Drawings

PROCESS AND CATALYST FOR PRODUCING PARTIALLY HYDROGENATED DIENE POLYMERS CONTAINING ENDO AND EXO CHAIN TRISUBSTITUTED UNSATURATION

FIELD OF THE INVENTION

The present invention relates to a process for obtaining endo and exo chain trisubstituted unsaturation while essentially eliminating 1,4-trans configuration backbone unsaturation in partially hydrogenated diene polymers and copolymers containing diene monomer contributed units and to the resultant polymers and copolymers formed by the process.

BACKGROUND OF THE INVENTION

Polymers prepared from conjugated dienes such as 1,3-butadiene are highly unsaturated containing both backbone and pendent unsaturation. The backbone unsaturation of polybutadiene is in the 1,4-trans-or 1,4-cis-configuration and the pendent unsaturation is in the 1,2-butadiene units, hereinafter referred to as either 1,2-microstructure or vinyl configuration. It is frequently desirable to reduce by hydrogenation the unsaturation in polybutadiene or other conjugated diene containing polymers to increase the stability of the polymer or to alter the chemical and physical characteristics of the polymer. Previous processes for hydrogenating polybutadienes or other diene containing polymers preferentially hydrogenated pendent unsaturated groups prior to hydrogenation of backbone unsaturation. It was thus impossible to produce partially hydrogenated polybutadiene having pendent unsaturation and a saturated backbone according to the processes of the prior art as disclosed in U.S. Pat. No. 4,207,409 to Ladenberger et al.

It is highly desirable to produce polymers from conjugated dienes such as polybutadiene having a substantially saturated backbone while creating non-backbone unsaturation for subsequent cross-linking. Such a polymer would be readily curable but would not be easily degraded along the backbone by oxygen or ozone, thus enabling the cured polymer to retain its cured properties.

SUMMARY AND OBJECTS OF THE INVENTION

It has been discovered that certain arylphosphine compounds having the structural formula: $R_1PR_2(R_3)$ wherein $R_1$ is an aryl group; and $R_2$ and $R_3$ are independently hydrogen or organic radicals containing from 1 to 20 carbon atoms, including alkyl, cycloalkyl, aryl or combinations of such groups such as aralkyl; can be used to isomerize vinyl and 1,4-trans configuration in the backbone of partially hydrogenated diene polymers or copolymers containing conjugated 1,3-diene contributed units into endo and exo chain trisubstituted unsaturation during hydrogenation with known hydrogenation catalysts. The partially hydrogenated polymers produced according to the process of the present invention contain endo and exo chain trisubstituted unsaturation while substantially eliminating the double bonds in the 1,4-trans configuration in the main chain of the polymer.

It is an object of the present invention to provide an isomerization process to isomerize diene contributed units containing 1,4-trans configuration and/or vinyl configuration during hydrogenation of conjugated diene polymers and copolymers to produce polymers and copolymers having cure sites attached directly to a carbon atom in the main chain backbone.

It is a further object of the present invention to produce hydrogenated diene polymers or copolymers having conjugated 1,3-diene contributed units having 1 to 10 percent of total unsaturation but less than 1 percent of the total unsaturation being present in a 1,4-trans, 1,4-cis, and vinyl configuration.

DETAILED DESCRIPTION OF THE INVENTION

As is well known, polymers can be prepared by polymerizing diolefins by themselves or with one or more unsaturated monomers. Such polymers may be prepared in solution using anionic initiators. These polymers are often hydrogenated to remove unsaturation. It is also well known that butadiene or other dienes polymerize into a variety of monomer contributed unit configurations including vinyl configuration (1,2-microstructure), 1,4-trans configuration and 1,4-cis configuration. During normal hydrogenation of diene polymers, 1,4-cis configuration and vinyl configuration are preferentially hydrogenated over 1,4-trans configuration units due to reduced steric hinderance.

The process of the present invention is performed during a standard hydrogenation process to isomerize the diene monomer contributed units having vinyl and 1,4-trans configuration into endo or exo chain trisubstituted unsaturation. The present isomerization process occurs only when a vinyl configuration is present and adjacent to 1,4-trans configuration or another 1,2-vinyl configuration. Thus, if vinyl configuration is adjacent to a 1,4-trans configuration as shown in formula (1):

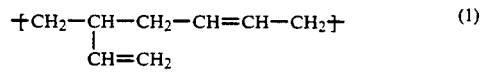

these two configurations are partially hydrogenated and isomerized by the present process so that isomerization produces a mixture of endo unit chain trisubstituted unsaturated as represented by the structure:

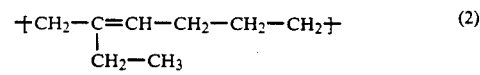

and exo unit chain trisubstituted unsaturated as represented by the structure:

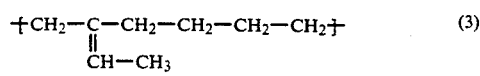

Two adjacent 1,2-butadiene units as shown in formula (4)

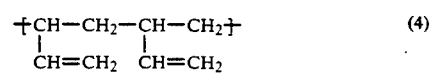

are partially hydrogenated and isomerized to produce a mixture of units containing endo configuration as shown in formula (5) and exo configuration as shown in formula (6):

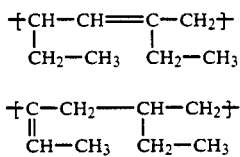

The present isomerization process produces a mixture of endo and exo configurations in diene polymers and the ratio of endo to exo configurations produced is unknown.

The presence of the endo and exo units in the isomerized diene polymers thermodynamically stabilizes the polymers due to the presence of a trisubstituted carbon atom in each unit. The isomerized unsaturation has an increased number of allyl groups which are used for curing. The presence of unsaturation in the exo group containing a trisubstituted carbon atom contributes units to a polymer or copolymer which are both easily curable and highly stable against oxidation. The presence of units having endo configuration stabilizes the resultant polymer against oxidation since the unsaturation in the endo configuration is more thermodynamically stable and is less subject to oxidation than the unsaturation in a 1,4-trans configuration. The steric hinderance of both types of trisubstituted unsaturation increases the stability of polymers containing such unsaturation against oxygen and heat degradation.

The polymers to be hydrogenated and isomerized by the process of the present invention are selected from homopolymers of butadiene or other conjugated dienes such as isoprene, 2,3-dimethylbutadiene, piperylene and the like and copolymers formed from at least 50 parts by weight of conjugated diene monomers and 50 or less parts by weight of ethylenically unsaturated monomers including monovinylidene aromatic hydrocarbons such as styrene (o-, m- and p-) and alkylstyrenes, and vinylpyridine. Homopolymers, random copolymers, block copolymers or graft copolymers can be hydrogenated and isomerized according to the process of the present invention. The terms "diene polymer" used heretofore and hereinafter means all of the aforementioned polymers or copolymers. The percent of unsaturation refers to the percentage of diene monomer contributed units containing unsaturation in the total amount of diene monomer contributed units.

For the practice of the present invention it is preferred to partial hydrogenate and isomerize diene polymers having 30 to 90 percent of the diene monomer contributed units in a vinyl configuration and 10 to 70 percent of the diene monomer contributed units in a 1,4-trans and/or 1,4-cis configuration. As these diene polymers are isomerized during hydrogenation, the remaining unsaturation in vinyl, 1,4-trans and 1,4-cis configuration is less than two percent, preferably less than one percent.

These diene polymers may have number-average molecular weights of from 1,000 to 1,000,000 and are preferably prepared by known anionic solution polymerization techniques using organo-metallic catalysts, for example, catalysts based on sodium, potassium, lithium, especially lithium alkyls.

Any solvent which does not adversely affect the catalyst and can dissolve the diene polymer to be hydrogenated may be used to provide the polymer solution. Suitable solvents include benzene, toluene, xylene, hexane, cyclohexane and tetrahydrofuran. When the polymer is prepared by a solution polymerization method, the resulting solution may be used as such for hydrogenation.

In a preferred embodiment of the invention, the hydrogenation is carried out directly following the polymerization of the diene polymer, preferably in the same reaction medium, at a concentration of from 1 to 80, preferably from 1 to 40, most preferably from 15 to 25 percent by weight of polymer based on the solution.

The present invention provides a process for creating unsaturation in endo and exo configurations, while eliminating unsaturation in either the vinyl configuration or in the 1,4-trans and 1,4-cis configuration in the backbone of partially hydrogenated diene polymers. The present isomerization process is used during hydrogenation to preferentially hydrogenate and isomerize the unsaturation in adjacent 1,2-vinyl configurations or the unsaturation in an adjacent 1,2-vinyl configuration and 1,4-trans configuration along the main chain of conjugated diene polymers into unsaturation in endo and exo configurations.

It has been determined that hydrogenation saturation can be controlled in diene polymers to obtain unsaturation units having endo and exo configuration while substantially eliminating 1,4-trans configuration in the main chain by treating the polymers in the presence of hydrogenating catalysts either during hydrogenation with an isomerizing effective amount of an arylphosphine compound having the formula:

$$R_1PR_2(R_3)$$

wherein $R_1$ is an aryl group; and $R_2$ and $R_3$ are independently hydrogen or organic radicals containing from 1 to 20 carbon atoms, including alkyl, cycloalkyl, aryl or combinations of such groups such as aralkyl. Preferred arylphosphine compounds include triphenylphosphine, diphenylphosphine, phenyldimethylphosphine, diphenylmethylphosphine and phenylphosphine.

As is known in the art, polymers from conjugated dienes can be partially hydrogenated using the following ranges of reaction conditions. It is preferable to use reaction pressures are preferably in the range from atmospheric to 200 atmospheres the usual range being within 1 to 50 atmospheres. The hydrogenation temperature can range from 20° to 200° C. with the preferred temperature range being between about 40° to 140° C. Reaction times depend upon the degree of saturation to be obtained and the amount of initial unsaturation, however reaction times are normally in the range of 0.5 to 5 hours, preferably 1 to 2 hours.

The rate of hydrogenation of the diene polymers of the present invention can be controlled by viscosity, $H_2$ pressure and stirring rate while the 1,4-cis, 1,4-trans and vinyl contents of the residual unsaturate is controlled by the specific hydrogenation catalyst concentration and temperature. By controlling these factors known hydrogenation catalysts systems can be selected to produce partially hydrogenated diene polymers having 1 to 50 percent of total unsaturation. In the usual case, partial hydrogenation of diene polymers to less than 10 percent unsaturation takes place after 1 or 2 hours.

In order to obtain polymers of the desired characteristics, the unsaturation should be reduced to a value of approximately 1 to 50 percent, based upon the theoretical value of 100 percent for the unhydrogenated diene contributed units in the diene polymer. After hydrogenation the residual unsaturation in the diene polymer should be preferably between 1 and 30 percent, most preferably between 2 and 10 percent of total unsaturation of the diene contributed units. The value desired within this unsaturation range depends upon the final desired use for the particular hydrogenated material.

Hydrogenation is preferably carried out in solution in an inert hydrocarbon, preferably in the same hydrocarbon solvent employed during polymerization. While any soluble hydrogenation catalyst system is acceptable for use in the present invention, hydrogenation catalysts are preferably, but not exclusively, a transition metal compound, such as Group VIII metal compounds including cobalt, nickel, or iron carboxylates or alkoxides in combination with a hydrocarbon-aluminum compound as a reducing agent.

These Group VIII metal compounds which are useful as hydrogenation catalysts are well known in the art and include Ni, Fe or Co compounds that are soluble in the inert hydrocarbon solvent. Examples of suitable Group VIII metal salts include the nickel, cobalt and iron salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable metal salts of the beta-diketones include the nickel salts of 2,4-pentanedione (acetylacetone), 3,5-heptanedione, 1,5-dicyclopentyl-2,4-pentanedione, and the like. Mixtures of the foregoing components can be used. Nickel salts of organic carboxylic acids are preferred, specifically nickel octanoate.

Any hydrocarbon-aluminum compound having the formula $AlR_3$, where at least one of the R's is a hydrocarbon radical and the other R's may be hydrogen or a hydrocarbon radical can be used as the reducing component in producing the catalyst useful in accordance with this invention. Exemplary of such hydrocarbonaluminum compounds are trimethylaluminum, triethylaluminum, tri-n-propylaluminum, triisopropylaluminum, tri-n-butylaluminum, triisobutylaluminum, triamylaluminum, trihexylaluminum, trioctylaluminum, tri-2-ethylhexylaluminum, tricyclohexylaluminum, triphenylaluminum, tribenzylaluminum, diethylaluminum hydride, diisobutylaluminum hydride and the like, and mixtures of any of these aluminum compounds.

The reaction of the transition metal compound and the hydrocarbon-aluminum compound is preferably done in situ by adding either one of the catalyst components to the reactor at the beginning of the reaction, and the second catalyst component then added continuously or incrementally during the reaction, or both catalyst components may be added either continuously or incrementally throughout the hydrogenation reaction. The catalyst components may be prereacted and used for the hydrogenation reaction if this prereaction is carried out under hydrogen and the unsaturated polymer solution is then added to the catalyst. The hydrocarbon-aluminum compound and transition metal compound are generally used in a molar ratio of from about 1.3:1 to about 20:1, preferably from about 2:1 to about 10:1 and more preferably from about 3:1 to about 5:1. The amount of the catalyst used for the hydrogenation reaction may be varied over a wide range and will depend somewhat upon the hydrogenation conditions and the unsaturated diene polymer that is being hydrogenated. The amount of catalyst based on the transition metal compound is generally in the range of 0.02 to 4 gram millimoles per 100 grams of the unsaturated diene polymer being hydrogenated, and preferably will be from about 0.04 to 0.5 gram millimoles per 100 grams of polymer.

It is optional but preferable to incorporate cyclohexene into the hydrogenation catalyst to stabilize the catalyst prior to hydrogenation. Cyclohexene is preferably used in a 0.5 to 2.0/1.0 ratio to the transition metal compound.

The arylphosphine isomerizing compound is generally effective in isomerizing the vinyl or 1,4-trans configuration unsaturation into endo and exo configuration unsaturation when used in a molar ratio of arylphosphine compound to transition metal component of from 1:2.5 to 1:20, preferably from 1:3 to 1:10, most preferably from 1:4 to 1:6. This ratio is an isomerizing effective amount of arylphosphine compound.

After the polymer is in solution, the arylphosphine compound is added either together, before or after the addition of the hydrogenation catalyst, but prior to or during hydrogenation. The subsequent hydrogenation is carried out with molecular hydrogen, which is advantageously introduced into the polymer solution as a gas. Hydrogen pressures of from 1 to 200 atmospheres may be used, those from 1 to 50 atmospheres being preferred. During the hydrogenation, the polymer solution is stirred vigorously so as to enable the hydrogen introduced to come sufficiently rapidly into contact with the polymer. The hydrogenation may be carried out at from 50° to 200° C., preferably from 70° to 140° C. Since the catalyst complexes are sensitive to oxygen, the process is advantageously carried out in the absence of oxygen. The hydrogenation reaction takes place very rapidly and normally the desired amount of partial hydrogenation occurs in 1 to 2 hours. The recovered partially hydrogenated diene polymer is isomerized according to the process of the present invention.

The partially hydrogenated and isomerized polymers can be recovered by any well known technique such as coagulation, removal of the diluent by evaporation, or the like. Catalyst residues can be separated from the polymer by well known methods.

During prior art hydrogenation processes it was typically observed that vinyl side groups undergo more rapid hydrogenation than double bonds along the polymer chain thus removing curing sites. Through the use of the arylphosphine compounds as an isomerizing agent in the process of the present invention during hydrogenation, isomerized partially hydrogenated diene polymers are produced having an unsaturation ratio of at least 3:1, preferably, 5:1, most preferably at least 16:1. The unsaturation ratio is the ratio of the number of carbon to carbon unsaturation groups present in the endo and exo configuration to the number of unsaturation groups present in 1,4-trans, 1,4-cis and vinyl configurations in the diene contributed units in the hydrogenated and isomerized diene polymers. The process of the present invention can provide hydrogenated diene polymers and copolymers having 1 to 10 percent of total unsaturation in the diene monomer contributed units but less than 1 percent of unsaturation in the 1,4-trans configuration in the polymer backbone or main chain.

The product resulting from hydrogenation and the present isomerization process may be examined by infrared analysis to determine the presence of unsaturation in the 1,4-trans, 1,4-cis and vinyl configurations. In the usual infrared analysis, any 1,4-trans structure will show strong absorbance at 10.35 microns, while any cis structures will show absorbance at 13.60 microns. The vinyl structure shows absorbance at two-wave lengths, namely, 10.98 and 10.05 microns. It is desirable in the final product that substantially no unsaturation, i.e., less than 1 percent, as measured by IR be present, and that all the IR unsaturation be present in the 1,4-trans configuration after the product is hydrogenated and isomerized. In the products of most commercial utility, the selectively hydrogenated and isomerized products will usually have from 1 to 10 percent unsaturation as measured by iodine titration, preferably 2 to 8 percent unsaturation and most preferably 3 to 5 percent unsaturation.

The curable, heat and oxygen stable elastomeric products produced according to the present invention are useful as plastics raw material in the rubber industry, and as the soft component in compounding high-impact thermoplastics.

The advantages of this invention are further illustrated by the following example. The reactants and their proportions and other specific conditions are presented as being typical and should not be construed to limit the invention unduly.

EXAMPLE 1

(a) Preparation of polymer

A 17.8% solution of polybutadiene polymer in hexane, the polybutadiene containing 62% of 1,2-microstructure was prepared utilizing catalyst system of oligomeric oxolanyl propane (OOPS) and n-butyllithium. The live polymer was terminated with alcohol and the polymer cement stored in a 0.5 gal reactor under nitrogen to be used for subsequent hydrogenation reactions.

(b) Preparation of hydrogenation catalyst

The catalyst was prepared in a $CCl_4$ dry ice bath at $-25°$ C. by sequentially charging a 10 oz. bottle with 2.25 cc of a dry hexane solution containing 0.9 mM of nickel octanate and 0.9 mM of cyclohexene followed by adding 4.43 cc of 0.61 molar triisobutyl aluminum (2.7 Mm).

(c) Hydrogenation and Isomerization (1) Control Polymer A (comparative example)

Hydrogenation was carried out in a clear $H_2$ purged reactor heated to 67° C. and charged with 2022 gm of polybutadiene cement (360 gm of PBD). The catalyst was added to the reactor together with 50 cc of hexane. The $H_2$ pressure of was increased to 150 psi through a bottom sparge tube. Repressurization with $H_2$ to 150 psi was done after each 100 psi reduction for the first two pressure drops and then after each subsequent 50 psi drop. After approximately one hour no further repressurization was necessary. The reactor was allowed to heat for three hours in total before the polymer was removed by adding it to isopropanol containing 3 cc of concentrated HCl and 1.8 g of Irganox 1076 and drum drying. The properties of recovered Control Polymer A are displayed in Table 1.

The unsaturation ratio as displayed in the last column of Table 1 shows the ratio of endo and exo configuration to the remaining total 1,4-trans, 1,4-cis or 1,2-vinyl configuration in the polymer after hydrogenation and isomerization. The unsaturation ratio is determined by averaging the total unsaturation of the polymer as determined by Iodine Titration and by Proton NMR and then subtracting the percentage of unsaturation as determined by Infrared Spectroscopy and then dividing this quotient by the percentage of unsaturation as determined by Infrared Spectroscopy.

(2) Control Polymer B (comparative example)

A 0.5 gallon reactor was charged with 2020 g. (360 g of polymer) of the polybutadiene solution of Example 1 (a) and purged with $H_2$ through a bottom sparge valve.

A hydrogenation catalyst was prepared in accordance with the procedure of Example 1 (b), however 3.6 Mm of triisobutyl aluminum was substituted for the previously recited amount. The hydrogenation catalyst was charged into the reactor at 67° C. with 50 cc of hexane and the pressure in the reactor was increased to 150 psi with $H_2$. Repressurization with $H_2$ to 150 psi was done after each 100 psi pressure drop for the first two pressure drops and then after each subsequent 50 psi drop during the first hour after which time the $H_2$ uptake was ceased. After three hours from the initial $H_2$ pressurization a sample of Control Polymer B was taken and its properties are shown in Table 1.

(3) Control Polymer C (comparative example)

Control Polymer C was prepared according to the procedure used to prepare Control Polymer B, however hydrogenation was carried out at 92° C. and 3.6 mM of nickel octanate and 10.8 mM of triethyl aluminum were utilized. The properties of recovered Control Polymer C are displayed in Table 1.

EXAMPLE 2

Isomerized Partially Hydrogenated Polymer of the Invention

Polybutadiene was hydrogenated in accordance with the procedure used to prepare Control Polymer B except that the 0.9 Mm of triphenyl phosphine in 5 cc of toluene was added to the hydrogenation catalyst mixture before the triisobutyl aluminum. The recovered hydrogenated polymer was white and rubbery and displayed the properties shown in Table 1.

EXAMPLES 3 TO 9

For Examples 3 to 9, the procedure in Example 2 was conducted utilizing 0.225 mM of an arylphosphine isomerizing compound, 0.9 Mm of nickel octanate and 2.70 mM of triisobutylaluminum, except Example 7 utilized 3.60 mM of triisobutylaluminum.

Example 3 utilized diphenylphosphine added to the reactor before the triisobutylaluminum. The hydrogenation reaction was conducted at a maximum temperature of 86° C.

Example 4 was conducted by mixing dimethylphenylphosphine into the hydrogenation catalyst and holding the catalyst mixture in the reactor for 1 hour at 66° C. before conducting hydrogenation at up to 86° C.

Example 5 was conducted according to the procedure of Example 4, however tritolylphosphine was utilized as the arylphosphhine and the hydrogenation was conducted at up to 82° C.

Example 6 was conducted according to the procedure of Example 4, however triphenylphosphine was utilized as the arylphosphine and initial hydrogenation was conducted at up to 92° C. and subsequent repressurization after 50 psi drops occurring during hydrogenation were initially conducted at 77° C.

Examples 7, 8 and 9 were conducted according to the procedure of Example 5, however triphenylphosphine was utilized as the arylphosphine and hydrogenation in each example was conducted at up to a maximum temperature of 101° C., 102° C. and 94° C. respectively.

TABLE 1

| Example No. | Total % 1,4-trans, 1,4-cis and 1,2-vinyl configuration[1] (a) | Total Unsaturation % by $I_2$[3] Titration (b) | % by Proton[4] NMR (c) | Unsaturation Ratio [0.5(b + c) − a]/a |
|---|---|---|---|---|
| Control Polymer A | 1.5 | (1.44)[2] | 6.9 | 4.3 | 2.84 |
| Control Polymer B | 1.9 | (0.98)[2] | 6.8 | 4.9 | 4.01 |
| Control Polymer C | 1.3 | (1.3)[2] | 5.9 | — | 3.03 |
| 2 | 0.2 | (0.2)[2] | 4.3 | 2.6 | 16.33 |
| 3 | 0.5 | (0.3)[2] | 3.3 | 2.5 | 11.91 |
| 4 | 0.7 | (0.41)[2] | 3.3 | 2.7 | 7.59 |
| 5 | 0.4 | (0.4)[2] | 3.3 | 2.1 | 5.76 |
| 6 | 0.2 | (0.2)[2] | 5.7 | 1.9 | 18.1 |
| 7 | 0.3 | (0.15)[2] | 3.4 | 2.0 | 16.43 |
| 8 | 0.7 | (0.34)[2] | 4.0 | 2.6 | 7.77 |
| 9 | 2.1 | (0.7)[2] | 6.0 | 3.7 | 3.93 |

[1]The total percent of the combined 1,4-trans, 1,4-cis and 1,2-vinyl configuration content of the polymer remaining after hydrogenation and isomerization as determined by Infrared Spectroscopy as shown in column (a).
[2]The 1,4-trans configuration percentage only remaining after hydrogenation and isomerization.
[3]Total unsaturation percentage (1,4-trans, 1,4-cis, 1,2-vinyl, endo and exo configurations as determined by Iodine Titration).
[4]Total Unsaturation percentage as determined by Proton NMR.

What is claimed is:

1. A partially hydrogenated and isomerized polymer of at least 50 to 100 parts by weight of a conjugated diene monomer contributed units and 0 to 50 parts by weight of an ethynically unsaturated monomer contributed units, wherein at least 30 to 100 percent of the diene monomer contributed units is in a vinyl configuration in the polymer prior to partial hydrogenation and 0 to 70 percent of the diene monomer contributed units is in a 1,4-trans configuration or 1,4-cis configuration in the polymer prior to partial hydrogenation, and wherein said partially hydrogenated and isomerized polymer has an unsaturation ratio of at least 3 to 1, said unsaturation ratio being defined as a ratio of a combined percentage of carbon to carbon unsaturation groups in the diene monomer contributed units in an endo and an exo configuration to a combined percentage of carbon to carbon unsaturation in the diene monomer contributed units in a 1,4-cis, 1,4-trans and vinyl configuration.

2. The partially hydrogenated polymer according to claim 1 having a percent unsaturation as measured by iodine titration between 1 and 10 percent.

3. The partially hydrogenated polymer according to claim 1 where said unsaturation ratio is at least 5 to 1.

4. The partially hydrogenated polymer according to claim 1 wherein said polymer is polybutadiene.

5. The partially hydrogenated polymer according to claim 1 wherein said polymer is a block copolymer of styrene/butadiene.

6. The partially hydrogenated polymer according to claim 1 wherein the polymer is a random copolymer of butadiene and styrene.

* * * * *